Patented Dec. 22, 1953

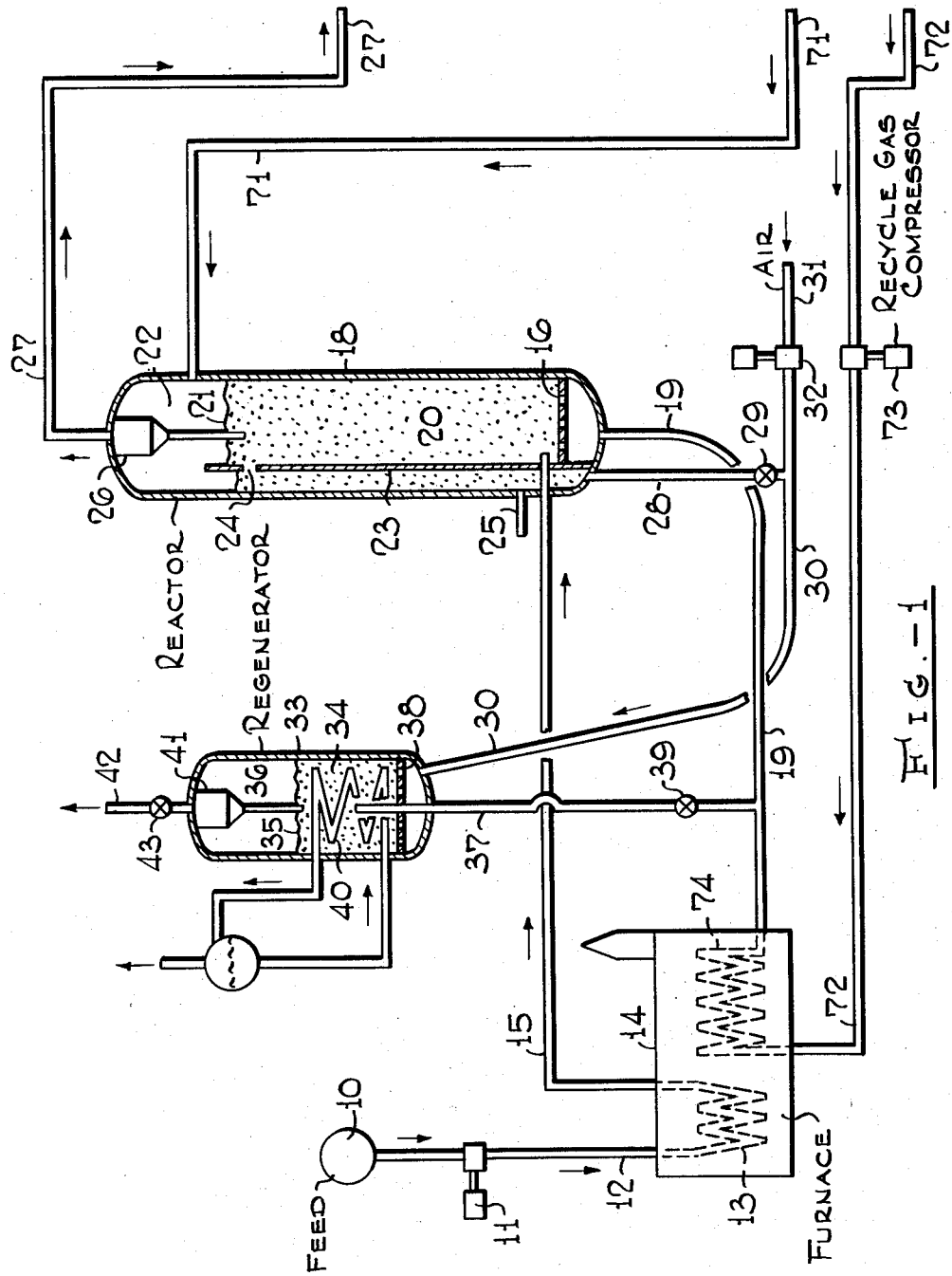

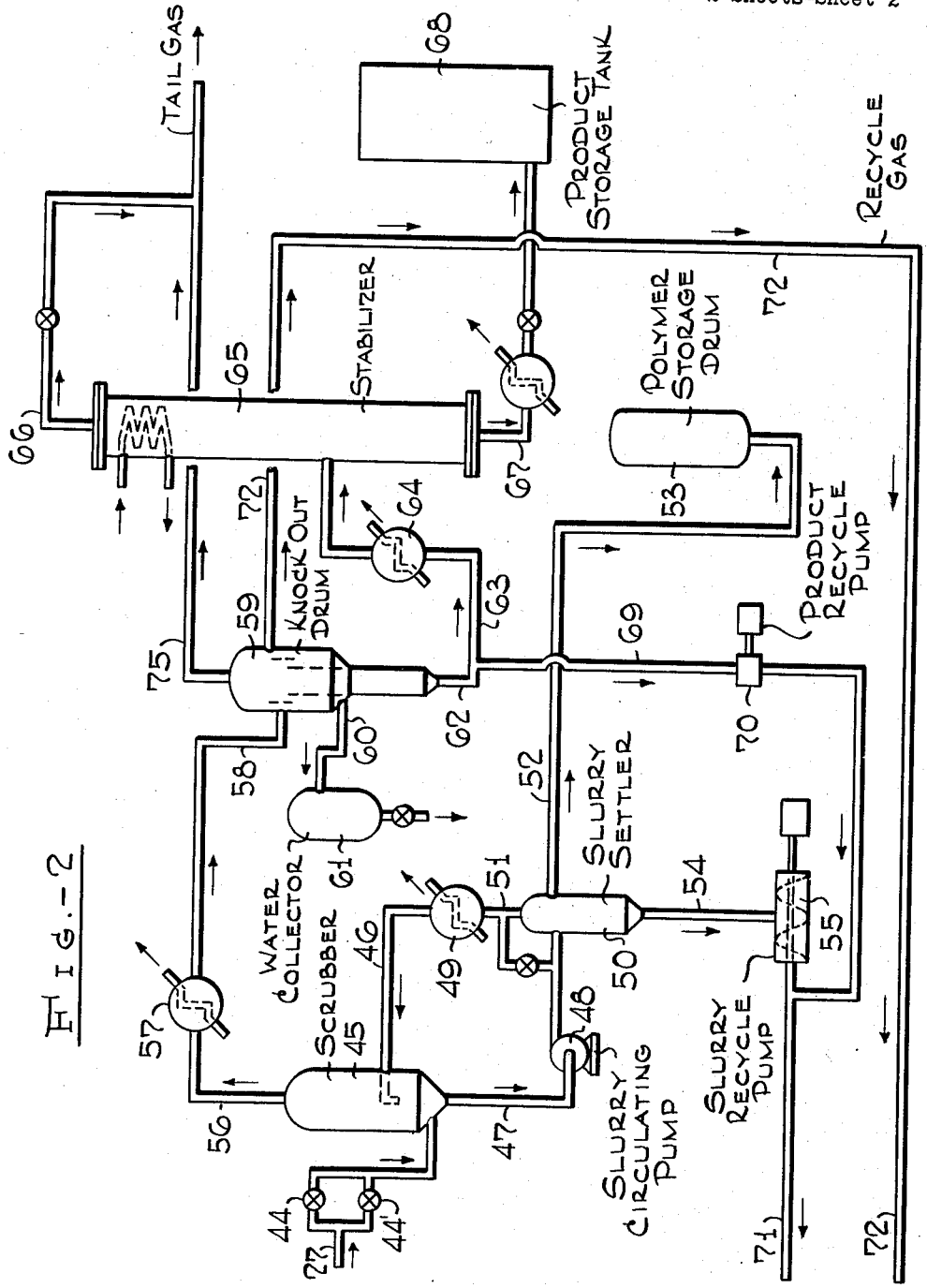

2,663,676

UNITED STATES PATENT OFFICE 2,663,676

CATALYST RECOVERY

Milton M. Cardwell and Otha C. Roddey, Baton Rouge, La., and Charles W. Tyson, Summit, N. J., assignors to Standard Oil Development Company, a corporation of Delaware Application March 16, 1951, Serial No. 216,049

9 Claims. (Cl. 196—50)

This invention pertains to the catalytic conversion of hydrocarbons and particularly to an improved process for the recovery of catalyst particles entrained with vaporous reaction products from a hydrocarbon conversion reactor operating in accordance with the fluidized solids technique.

This invention will be described hereinbelow as applied to a fluid hydroforming operation. It will be understood, however, that it is equally applicable to fluid catalytic cracking or other hydrocarbon conversion operations employing the fluidized solids technique.

Hydroforming is a well known and widely used process for treating hydrocarbon fractions boiling within the motor fuel or naphtha range to upgrade the same or increase the aromaticity and improve the antiknock characteristics of said hydrocarbon fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are usually carried out in the presence of hydrogen or hydrogen-rich recycle gas at temperatures of 750–1150° F. in the pressure range of about 50–3000 lbs. per sq. inch and in contact with such catalysts as molybdenum oxide, chromium oxide, or, in general, oxides or sulfides of metals of groups IV, V, VI, VII and VIII of the periodic system of elements alone or generally supported on a base or spacing agent such as alumina gel, precipitated alumina or zinc aluminate spinel. A good hydroforming catalyst is one containing about 10 wt. per cent molybdenum oxide upon an aluminum oxide base prepared by heat treating a hydrated aluminum-oxide or upon a zinc aluminate spinel.

It has also been proposed to reform naphtha or gasoline fractions by subjecting them to the action of certain platinum- or palladium-containing catalysts at temperatures of 500 to about 950° F. and at pressures of from about atmospheric to about 1000 lbs. per sq. inch at hourly liquid space velocities of from about 0.1 to about 5, in the presence of from about 0.5 to about 10 mols of hydrogen per mol of feed. Catalysts suggested for this purpose comprise 0.2 to about 2.0 wt. per cent of platinum or palladium upon commercial alumina or upon a dry cracking catalyst such as silica-alumina, silica-magnesia or the like. Another catalyst of this type is prepared by precipitating alumina from aluminum chloride, commingling about 0.1 to about 3.0 weight per cent of hydrogen fluoride therewith, adding hydrogen sulfide to a chlorplatinic acid solution, commingling the resultant solution with the fluoride-containing alumina, drying and heating the resultant composite.

It has been proposed in application Serial No. 188,236 filed October 3, 1950, to effect the hydroforming of naphtha fractions in a fluidized solids reactor system in which naphtha vapors are passed continuously through a dense, fluidized bed of hydroforming catalyst particles in a reaction zone, spent catalyst being withdrawn from the dense bed and passed to a separate regeneration zone where inactivating carbonaceous deposits are removed whereupon the regenerated catalyst is returned to the main reaction vessel. Fluid hydroforming has several fundamental advantages over fixed bed hydroforming such as (1) the operations are continuous, (2) the vessels and equipment can be designed for single rather than dual functions, (3) the reactor temperature is constant and simulates isothermal fixed bed operations, and (4) the regeneration or reconditioning of the catalyst may be readily controlled.

In the conduct of hydrocarbon conversion operations wherein hydrocarbon vapors are passed through a dense, fluidized, liquid-simulating bed of finely divided catalyst particles, small amounts of catalyst particles become entrained in the vaporous reaction products and even after passage through cyclone separators or the like which remove the major proportion of the entrained catalyst particles, small residual amounts of catalyst remain in the product vapor stream. It is desirable, if not essential to the economical operation of this process to recover this residual catalyst from the product vapors. It has been proposed to recover this catalyst by quenching or partially condensing the product vapors to separate the residual catalyst as a slurry, concentrating and, if desired, filtering the slurry, reslurrying the recovered catalyst in fresh feed and introducing the slurry of recovered catalyst and fresh feed to the bottom of the reactor bed.

It is the object of this invention to provide a novel method of recovering finely divided catalyst particles from vaporous hydrocarbon reaction products produced in a conversion system employing the fluidized solids technique.

It is a further object of this invention to effect the recovery of finely divided catalyst particles from vaporous hydrocarbon reaction products while minimizing the reintroduction and retreating of certain product constituents which have a pronounced carbon forming tendency.

These and other objects will appear more clearly from the detailed specification and claims which follow.

It has been found that recovery of small, residual amounts of finely divided catalyst can be effected and the conduct of a hydrocarbon conversion operation employing the fluidized solids technique improved by quenching or partially condensing the product stream from the reactor to entrap residual amounts of catalyst in liquid droplets forming a slurry of catalyst in condensate, concentrating the slurry and, if desired, filtering the same, reslurrying the recovered catalyst in liquid product and introducing the resultant slurry into the upper part of the reactor. In this way not only is the catalyst recovered but polymer and other polycyclic compounds that are adsorbed upon the catalyst particles are stripped from the catalyst in the disperse phase at the top of the reactor, a zone of relatively high hydrogen partial pressure and immediately passed unaltered out of the conversion reactor in admixture with vaporous reaction products. When catalyst with the said polymers adsorbed thereon is introduced with fresh feed into the base of the reactor, stripping is not so readily accomplished because of higher hydrocarbon—and lower hydrogen partial pressure at the bottom of the catalyst bed and passage of the catalyst with said polymers up through the bed subjects the said polymers to conversion conditions for a sufficient period to cause excessive coke deposition on the catalyst because of the high carbon forming properties of the polymers under said conversion conditions. Moreover, if the recovered catalyst particles are slurried with fresh feed, the feed must be cold and the dilute slurry must be introduced into the reactor cold because the catalyst-containing feed can not be passed through a preheating furnace without coking.

Reference is made to the accompanying drawing illustrating a schematic flow plan of one embodiment of this invention.

In the drawing, the feed or charging stock is introduced through line 1 to feed pump 11 and thence via line 12 to heat exchange coils 13 arranged in furnace 14. The feed or charging stock may be a virgin naphtha, a cracked naphtha, Fischer-Tropsch naphtha or the like. When used for catalytic cracking, the feed stock would be a gas oil or similar high boiling stock. The feed stock, preheated in coils 13 to substantially reaction temperature is then conducted through line 15 to distribution nozzles arranged at or just above distribution grid 16 near the bottom of reactor vessel 18.

The reactor 18 is charged with a mass of finely divided catalyst particles above grid member 16. Suitable hydroforming catalysts include group VI metal oxides, such as molybdenum, chromium or tungsten oxide, or mixtures thereof upon a carrier such as activated alumina, zinc aluminate spinel or the like, or precious metals such as platinum or palladium upon a dry cracking catalyst such as silica-alumina, silica-magnesia or the like, or upon a hydrogen fluoride treated activated alumina. Suitable cracking catalysts include acid activated bentonite clays, and synthetic composite gel catalyst such as silica-alumina, silica-magnesia and the like. The catalyst particles are, for the most part between 200 and 400 mesh in size or about 0 to 200 microns in diameter with a major proportion between 20 and 80 microns.

A stream of hot hydrogen-containing gas containing freshly regenerated or activated catalyst particles is introduced through line 19 into the bottom of the reactor 18 below the grid member 16. The grid member serves to distribute the catalyst and gas uniformly over the full cross-sectional area of the reactor. In starting up the process for the first time, hydrogen-containing gas may be supplied from an extraneous source. The process, however, normally evolves hydrogen and accordingly the hydrogen-containing gas will normally be recycled process gas.

The naphtha vapors supplied through line 15 and the hydrogen-containing gas are passed as a mixture up through the reaction zone at a superficial velocity of about 0.2 to 0.9 ft. per second at reactor conditions depending upon the pressure. For example, the velocity should be below 0.6 ft. per second in the pressure range of 200-250 lbs. per sq. inch gauge. The velocity should be sufficient to maintain a dense turbulent, liquid-simulating bed 20 of solids and gas having a level 21 with a dilute phase suspension of gas and solids 22 thereabove. Lower linear gas velocities are used for higher pressures to obtain a dense, fluidized bed. If desired, the reactor 18 may be provided with horizontally arranged perforated baffles spaced vertically therein or vertically arranged and spaced baffle members to improve contacting between hydrocarbon vapors and catalyst.

A vertical internal conduit 23 is provided in the reactor 18, for the withdrawal of catalyst directly from the dense bed 20. The upper end of the conduit 23 extends above the bed level 21 and has an orifice or port 24 at one or more points along its length to permit flow of catalyst from the dense bed 20 into the conduit 23. Inasmuch as the catalyst and hydrocarbons are introduced at the lower end of reactor 18 and product vapors are removed overhead and catalyst is removed from the upper part of bed 20, there is a general concurrent flow of hydrocarbon vapors and catalyst in reactor 18. The orifice or port 24 may be located near the top of bed 20 to obtain maximum concurrent flow of catalyst and oil vapors up through the bed 20. However, the orifice should be sufficiently below the level 21 to take care of any normal fluctuations in the level 21. More than one orifice or port 24 may be provided at different levels in conduit 23 and each port may be provided with valves to control the flow of catalyst into conduit 23 and thereby control the depth of the dense bed 20.

Steam or an inert gas such as nitrogen, flue gas or the like or mixture thereof is supplied to conduit 23 through line 25 near the base of conduit 23 to displace, strip-off or desorb hydrogen, hydrocarbon reactants or reaction products flowing into conduit 23 along with the catalyst, the stripping gas being passed upwardly through conduit 23 countercurrent to the downflowing catalyst. The superficial velocity of the stripping gas through conduit 23 should be equal to or higher than the superficial velocity of the vapors and gases passing upwardly through the reactor 18.

The stripping gas and stripped out constituents are discharged from the top of conduit 23 into the dilute phase 22 and are combined with the reaction product vapors leaving the dense bed 20 and the mixture is passed through one or more cyclone separators 26 to remove entrained catalyst particles and then withdrawn through line 27 to product recovery equipment described below. The stripping of the catalyst particles decreases the amount of combustible material which must be burned off or removed during the regeneration of the catalyst. If desired, a separate stripping vessel may be used for the stripping step with the stripping gas and stripped-out constituents leaving the stripper being conducted to the reactor outlet line 27 or being separately treated to recover hydrocarbons therefrom.

Stripped catalyst particles are discharged into conduit 28 at the bottom of reactor vessel forming a standpipe for developing the fluistatic pressure necessary to overcome the pressure drop through the regeneration system. If necessary, some additional gas may be added at one or more spaced points in conduit 28. However, catalyst flowing from the base of conduit 23 into conduit 28 will ordinarily carry entrained or trapped gas with it in an amount sufficient to maintain it in a free flowing fluid condition throughout its passage through conduit 28 and flow control valve 29. Moreover, since the process is carried out under elevated pressures of 100 lbs. per sq. inch or higher which is much higher than the pressure drop through the regeneration system, the amount of pressure build up in the standpipe is relatively small compared to the pressure in the process and consequently there is less compression of the gas entering the top of standpipe 28. In addition by keeping the rate of downflow of solids in the standpipe relatively high as by making the diameter of the standpipe 28 relatively small as compared to the diameter of the conduit 23, the tendency of the catalyst stream to deaerate will be reduced if not eliminated.

Catalyst is discharged from the base of standpipe 28 into conduit 30 wherein the catalyst is picked up by a stream of air or other carrier gas supplied through line 31 and compressor 32 and conveyed to regenerator 33. It may be desirable to split the supply of air to the regenerator using only a part of the air necessary for regeneration for conveying the catalyst to the regenerator and introducing the remainder of the air at spaced points in the regenerator. While the line 30 for conveying spent catalyst from the reactor to the regenerator is shown discharging into the bottom of the regenerator 33, it may be advantageous to introduce the spent catalyst at the top of the regenerator and effect regeneration in stages countercurrent to the regeneration gas.

The velocity of the gas passing upwardly through the regenerator is controlled to maintain a lower dense, highly turbulent fluidized bed 34 of catalyst particles and gas having a definite level 35, and a dilute or disperse catalyst phase 36 in the upper part of the regenerator. To accomplish this the superficial velocity of the gas passing through the regenerator 33 may range between 0.3 and 1.5 feet per second, depending upon the pressure, for example, at about 1.0 feet per second at a regeneration pressure of about 200–250 lbs. per sq. inch. A conduit 37 for the withdrawal of regenerated catalyst extends from the middle or upper portion of dense bed 34 downwardly through distribution plate or grid 38 and is connected at its base to transfer line 19. A control valve 39 is desirably provided in the conduit 37 which serves as a standpipe for developing sufficient fluistatic pressure to take care of the pressure drop of the catalyst passing through the reactor vessel. If desired, one or more aeration taps can be provided to keep the regenerated catalyst in standpipe 37 in a fluid condition at all times. In order to control the temperature in regenerator 33 it may be desirable to provide coils 40, through which water or other heat exchange fluid may be circulated. The coils 40 are preferably so arranged to have a certain area in contact with the dense bed 34 at all times with a smaller area extending upwardly into the dilute phase 36 so that the heat exchange capacity of the coils 40 may be varied simply by changing the level 35 of the dense fluidized bed. The gaseous products from the regeneration are taken overhead, passed through cyclone separators 41 to remove the bulk of the entrained catalyst particles which are returned to the dense bed 34 by the dip pipe attached to the cyclones whereupon the gases are discharged through flue 42 or, if desired, processed to recover heat or energy therefrom and/or utilized as stripping gas in the process. A pressure control valve 43 may be used in order to maintain the desired pressure on the regeneration zone.

The freshly regenerated catalyst particles discharged from standpipe 37 into conduit 19 are picked up by a stream of hydrogen-containing gas, preferably recycle process gas. Under the conditions obtaining during regeneration the catalytic metal oxide frequently may undergo a chemical change which affects its catalytic activity. When the freshly regenerated catalyst is contacted with the hydrogen-containing recycle gas substantially at regenerator temperature a somewhat exothermic reaction may result during which the catalyst may be restored to its selective form. It is advisable to control this reaction to avoid permanent deactivation of the catalyst as would occur if, for example, the temperature level reached is too high. Generally, contact of the regenerated catalyst with hydrogen-containing gas at temperatures of not more than about 1200° F. for from about 1 to 10 seconds should suffice to render the catalyst suitable for reintroduction into the reactor.

Returning now to the reactor 18, the reaction products as stated above are taken overhead through cyclone separator or separators 26 or the like which removes most but not all of the entrained catalyst particles. The reaction products are then passed through line 27 to product recovery equipment. The reaction products containing small residual amounts of catalyst are passed through a pressure control valve 44 and thence into scrubber 45. In view of the danger of erosion it is desirable to have a second control valve 44 in parallel to facilitate repairs to the valves during operation. The reaction products introduced into scrubber 45 are contacted with a spray of relatively heavy oil introduced through line 46. The quenching oil may be a heavy polymer oil formed in the process or it may be a relatively heavy oil from an extraneous source. The temperature and the amount of quenching oil introduced should be sufficient to cool the reaction product vapors below the condensation point of the heavy polymers formed in the process. The droplets of quenching oil and the droplets of heavy polymer formed entrap the small residual amounts of catalyst carried in the product vapors and carry them to the bottom of scrubber 45. The resultant slurry of catalyst particles in quenching oil or polymer is withdrawn from scrubber 45 through line 47 and circulated by slurry pump 48 through cooler 49 and then through line 46 back into the scrubber. In order to maintain a pumpable slurry, part of the slurry is passed to slurry settler 50, where catalyst particles are allowed to settle out, clarified oil being withdrawn through line 51 for admixture with the circulating slurry, excess clarified oil being withdrawn from settler 50 through line 52 and passed to polymer storage drum 53 or suitable processing equipment.

The thickened slurry of catalyst in quenching oil or polymer oil is withdrawn from the bottom of slurry settler 50 through line 54 and discharged into the thickened slurry recycle pump 55. In order to remove further amounts of quenching or polymer oil, the thickened slurry may be filtered through Porostone filters or the like and the filter cake then recycled to the reactor as described below.

The reaction products freed of residual catalyst are taken overhead from the scrubber 45 through line 56, passed through condenser 57 to condense normally liquid products and thence via line 58 into an oil-water-gas separator or knockout drum 59. Water is withdrawn from the knock-out drum 59 through line 60 and passed into collector 61 while liquid product is withdrawn from the knock-out drum through line 62. The main portion of the liquid product is passed via line 63 to heat exchanger 64 and thence to stabilizer 65 wherein lower boiling products are taken off overhead through line 66 while stabilized liquid product is taken off through line 67, cooled and passed to product storage 68.

Some of the liquid product withdrawn from the knock-out drum 59 through line 62 is passed via line 69 to product recycle pump 70 and thence to slurry recycle line 71 for admixture with the residual catalyst particles recovered from the reaction products. The product recycle may be used to thin out the thickened slurry so that it may be readily pumped back to the reactor or, if the slurry of catalyst in polymer oil withdrawn from settler 50 is filtered, the product recycle may be used for backwashing the filter to make a pumpable slurry of catalyst for recycling to the reactor.

In accordance with this invention the slurry of recovered catalyst in liquid product is recycled via line 71 to the top of the reactor ahead of the reactor cyclones. The slurry is preferably introduced at or near the dense bed disperse phase interface since in this region the hydrogen partial pressure is at a maximum due to the hydrogen produced in the conversion. High hydrogen partial pressure facilitates the stripping of polymer and heavy products adsorbed by the catalyst particles. It is especially desirable to strip off these heavy polymers at the top of the reactor in order to avoid subjecting these materials, which have pronounced carbon forming properties, to conversion conditions which would convert said polymers to coke or other carbonaceous deposit to the detriment of the activity of the catalyst. The product stream used for reducing the thickened slurry or slurrying the filter cake is especially suitable for this purpose because of the fact that having once passed through the reactor these products are relatively stable and, therefore, are not adversely affected by recycling to the top of the reactor. Fresh feed is not suitable for this purpose since it would pass essentially unaltered out of the reactor. It may be desirable in some cases to omit the slurry settler completely, in which case all of the heavy product would be returned to the top of the reactor or to thicken the slurry only to a limited extent so that it will remain pumpable so that it may be returned to the reactor top without dilution.

Returning again to the separator or knock-out drum 59, recycle gas is withdrawn through line 72, compressed in recycle gas compression 73 and passed through heat exchange coils 74 in furnace 14 where they are heated to temperatures sufficiently high to convey a substantial part if not all the heat required for the reaction. The preheated recycle gas withdrawn from coils 74 picks up the regenerated catalyst particles discharged from standpipe 37 and conveys the same through conduit 19 into the reactor 18. The excess gas over that needed for recycle and to maintain pressure is withdrawn from separator 59 through line 75 and combined, if desired, with the gas removed from the stabilizer 65 and recovered or used as fuel.

While the foregoing description has disclosed in detail the use of the present invention in a fluid hydroforming process, it will be understood that it may be used as well in other hydrocarbon conversion operations employing the fluidized solids technique. In catalytic cracking, for example, gas recycle would be eliminated and the preheated feed stock would be mixed with hot regenerated catalyst from standpipe 37 and passed through line 19 into the bottom of the reactor. Partial condensation of the product will permit recovery of residual catalyst as a slurry in heavy cycle stock. This cycle stock, similar to the heavy polymer from the hydroforming operation forms much carbon under the conditions in the reactor bed and accordingly thickening the slurry or filtering to remove the bulk of the heavy cycle stock and thinning the slurry or backwashing the filter with lighter cracked product to form a pumpable slurry of recovered catalyst and introducing this slurry at the top of the reactor permits rapid stripping of adsorbed cycle stock from the catalyst without appreciable cracking thereof to coke as would occur if the slurry was charged to the bottom of the reactor.

The foregoing specification contains a limited number of embodiments of the present invention. It will be understood, however, that numerous variations are possible without departing from the scope of the following claims.

What is claimed is:

1. In a process for the conversion of hydrocarbons in contact with finely divided catalyst particles in accordance with the fluidized solids technique wherein hydrocarbon feed stock is contacted with a dense, fluidized bed of catalyst particles in the lower portion of the conversion zone, the improvement which comprises withdrawing a stream of vaporous reaction products containing residual amounts of entrained catalyst particles from the top of the conversion zone, partially condensing the product vapors to separate the residual catalyst as a slurry in heavy product and recycling the recovered residual catalyst directly into the disperse phase in the upper portion of the conversion zone.

2. In a process for the conversion of hydrocarbons in contact with finely divided catalyst particles in accordance with the fluidized solids technique wherein hydrocarbon feed stock is contacted with a dense, fluidized bed of catalyst particles in the lower portion of the conversion zone, the improvement which comprises withdrawing a stream of vaporous reaction products containing small residual amounts of entrained catalyst particles from the top of the conversion zone, partially condensing the product vapors to separate the residual catalyst as a slurry in heavy product, separating a part of the heavy product from said slurry and recycling the recovered residual catalyst directly into the disperse phase in the upper portion of the conversion zone.

3. In a process for the conversion of hydrocarbons in contact with finely divided catalyst particles in accordance with the fluidized solids technique wherein hydrocarbon feed stock is contacted with a dense, fluidized bed of catalyst particles in the lower portion of the conversion zone, the improvement which comprises withdrawing a stream of vaporous reaction products containing residual amounts of entrained catalyst particles from the top of the conversion zone, partially condensing the product vapors to separate the residual catalyst as a slurry in heavy product, separating a part of the heavy product from said slurry, adding lighter liquid product in sufficient amount to form a pumpable slurry and recycling the pumpable slurry of recovered residual catalyst directly into the disperse phase in the upper portion of the conversion zone.

4. In a process for hydroforming hydrocarbon fractions boiling within the motor fuel range in contact with finely divided hydroforming catalyst particles in accordance with the fluidized solids technique wherein hydrocarbon feed stock is contacted with a dense, fluidized bed of hydroforming catalyst particles in the lower portion of the hydroforming reaction zone, the improvement which comprises withdrawing a stream of hydroformate vapors containing small residual amounts of entrained hydroforming catalyst particles from the top of the hydroforming reaction zone, partially condensing the hydroformate vapors to separate the residual catalyst particles as a slurry in heavy polymer and recycling the recovered residual hydroforming catalyst directly into the disperse phase in the upper portion of the hydroforming reaction zone.

5. In a process for hydroforming hydrocarbon fractions boiling within the motor fuel range in contact with finely divided hydroforming catalyst particles in accordance with the fluidized solids technique wherein hydrocarbon feed stock is contacted with a dense, fluidized bed of hydroforming catalyst particles in the lower portion of the hydroforming reaction zone, the improvement which comprises withdrawing a stream of hydroformate vapors containing small residual amounts of entrained hydroforming catalyst particles from the top of the hydroforming reaction zone, partially condensing the hydroformate vapors to separate the residual catalyst particles as a slurry in heavy polymer, separating a part of the heavy polymer from said slurry and recycling the recovered residual hydroforming catalyst directly into the disperse phase in the upper portion of the hydroforming reaction zone.

6. In a process for hydroforming hydrocarbon fractions boiling within the motor fuel range in contact with finely divided hydroforming catalyst particles in accordance with the fluidized solids technique wherein hydrocarbon feed stock is contacted with a dense, fluidized bed of hydroforming catalyst particles in the lower portion of the hydroforming reaction zone, the improvement which comprises withdrawing a stream of hydroformate vapors containing residual amounts of entrained hydroforming catalyst particles from the top of the hydroforming reaction zone, partially condensing the hydroformate vapors to separate the residual catalyst particles as slurry in heavy polymer, separating a substantial part of the heavy polymer from said slurry, adding lighter liquid hydroformate in sufficient amount to form a pumpable slurry of recovered residual hydroforming catalyst and recycling this slurry directly into the disperse phase in the upper portion of the hydroforming reaction zone.

7. In a process for hydroforming hydrocarbon fractions boiling within the motor fuel range in contact with finely divided hydroforming catalyst particles in accordance with the fluidized solids technique wherein hydrocarbon feed stock is contacted with a dense, fluidized bed of hydroforming catalyst particles in the lower portion of the hydroforming reaction zone, the improvement which comprises withdrawing a stream of hydroformate vapors containing small residual amounts of entrained hydroforming catalyst particles from the top of the hydroforming reaction zone, partially condensing the hydroformate vapors to separate the residual catalyst particles as a slurry in heavy polymer, separating a substantial part of the heavy polymer from said slurry, filtering the thickened slurry to remove further amounts of heavy polymer forming a pumpable slurry by adding hydroformate to the filter cake and recycling the resultant slurry directly into the disperse phase in the upper portion of the hydroforming reaction zone.

8. In a process for cracking hydrocarbon oils in contact with finely divided cracking catalyst particles in accordance with the fluidized solids technique wherein hydrocarbon feed stock is contacted with a dense, fluidized bed of cracking catalyst particles in the lower portion of the cracking reaction zone, the improvement which comprises withdrawing a stream of cracked hydrocarbon vapors containing small, residual amounts of entrained catalyst particles from the top of the cracking reaction zone, partially condensing the cracked vapors to separate the residual catalyst particles as a slurry in heavy cycle oil, separating a substantial part of the heavy cycle oil from said slurry and recycling the recovered residual cracking catalyst particles directly into the disperse phase in the upper portion of the cracking reaction zone.

9. In a process for cracking hydrocarbon oils in contact with finely divided cracking catalyst particles in accordance with the fluidized solids technique wherein hydrocarbon feed stock is contacted with a dense, fluidized bed of cracking catalyst particles in the lower portion of the cracking reaction zone, the improvement which comprises withdrawing a stream of cracked hydrocarbon vapors containing residual amounts of entrained catalyst particles from the top of the cracking reaction zone, partially condensing the cracked vapors to separate the residual catalyst particles as a slurry in heavy cycle oil, separating a substantial part of the heavy cycle oil from said slurry, adding lighter liquid cracked product in sufficient amount to form a pumpable slurry of recovered residual cracking catalyst particles and recycling this slurry directly into the disperse phase in the upper portion of the cracking reaction zone.

MILTON M. CARDWELL.
OTHA C. RODDEY.
CHARLES W. TYSON.

References Cited in the file of this patent
UNITED STATES PATENTS

| Number | Name | Date |
|---|---|---|
| 2,429,161 | Hudson | Oct. 14, 1947 |
| 2,541,635 | Boyer | Feb. 13, 1951 |
| 2,549,518 | Perry | Apr. 17, 1951 |